Dec. 25, 1962   A. E. ANTUNEZ, JR   3,070,118
FLOAT-OPERATED VALVE
Filed Nov. 1, 1960

INVENTOR.
ARMAND E. ANTUNEZ JR.
BY
Lyon & Lyon
ATTORNEYS

3,070,118
FLOAT-OPERATED VALVE
Armand E. Antunez, Jr., Glendora, Calif. (% Coast Foundry & Mfg. Co., 2700 E. 1st St., La Verne, Calif.)
Filed Nov. 1, 1960, Ser. No. 66,506
3 Claims. (Cl. 137—436)

This invention relates to float-operated valves, and is, more particularly, an improvement of the Anti-siphonic Ball Cock disclosed in Patent No. 2,635,622, issued April 21, 1953, to Jesse C. Owens.

Included in the objects of this invention are:

First, to provide a valve of this type wherein the valve tends to remain in substantially its open position until the float exerts a predetermined force thereon, then quickly moves to its fully closed position, as distinguished from a gradual closing movement typical of conventional float-operated valves.

Second, to provide a valve of this type which, though adapted to close quickly, is sufficiently cushioned in its closing movement to avoid water hammer.

With the above and other objects in view, as may appear hereinafter, reference is directed to the accompanying drawings in which.

Figure 1:
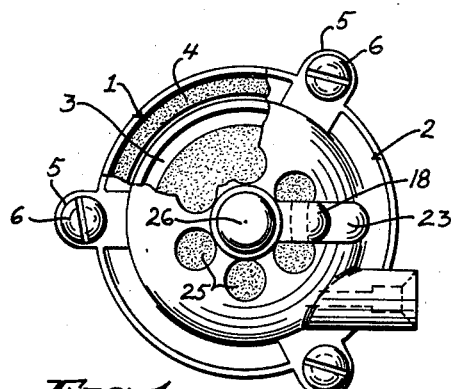
FIGURE 1 is a plan view of the valve with portions broken away to illustrate the interior construction.
Figure 2:
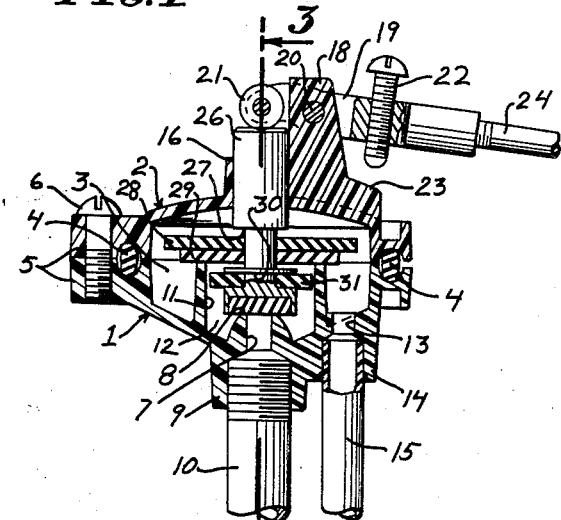
FIGURE 2 is a sectional view thereof taken through 2—2 of FIGURE 1, with the valve shown in its closed position.

The float-operated valve includes a cupped lower housing 1 and a domed upper housing 2, together defining a chamber 3. The housings are provided with annular confronting channels surrounding the chamber 3 and adapted to receive a gasket 4. The housings are also provided with radiating pairs of lugs 5, which are connected by screws 6 to draw the housings together and clamp the gasket 4.

The lower housing 1 is provided with a centrally disposed, upwardly directed, inlet bore 7 terminating in a valve seat 8. An internally screw-threaded boss 9 extends downwardly from the lower housing 1 in concentric relation to the inlet bore 7 into which is screwed the upper end of an inlet pipe or tube 10.

Surrounding the valve seat 8 in spaced relation therewith is an upwardly extending, cylindrical wall 11 forming a cylindrical cavity 12 within the chamber 3. Radially outwardly of the cavity 12 the chamber 3 defines an annular recess intersected with an outlet bore 13 communicating with an external downwardly directed boss 14 into which is fitted the upper end of an outlet tube 15.

The upper housing 2 is provided with an upwardly extending boss 16 in coaxial relation with the inlet bore 7. At one side of the boss 16 is a bracket 18, which projects upwardly through the bifurcated end of a lever member 19 and journals the lever by means of a pin 20. The bifurcated end of the lever member extends over the boss 16 and journals a roller 21. At the opposite side of the pin 20, the lever member 19 receives a downwardly directed stop screw 22 which engages a stop lug 23 in the form of a shoulder projecting radially from the base of the bracket 18. Screw-threaded into the extended end of the lever member 19 is a rod 24, at the remote end of which is a float, not shown.

The upper housing 2 is provided with a ring of antisiphon apertures 25 surrounding the boss 16, and communicating with the chamber 3.

The boss 16 slidably receives a stem 26 which is engaged and depressed by the roller 21. The stem 26 is provided with an upper annular groove 27 which loosely receives a pair of yieldable antisiphon washers 28 and 29. The upper of these washers is dimensioned to cover and close the antisiphon apertures 25. Below the groove 27, the stem 26 is provided with a second groove 30 which snuggly receives a retarding disk 31. The lower end of the stem 26 is provided with a recess which receives a valve washer 32 adapted to engage the valve seat 8.

The lower end of the stem 26 and the flange which separates the grooves 27 and 30 is larger in diameter than the main portion of the stem 26 and forms with the cylindrical wall 11 surrounding the cavity 12 a constricted annular flow passage from the inlet bore 7. This passage is further constricted by the marginal portion of the retarding disk 31.

The retarding disk 31 is formed of rubber or other elastomer but is relatively stiff, and is firmly retained in the groove 30. Its marginal portion is, however, capable of slight deflection. The annular passage defined between the disk 31 and the wall 11, as well as the thickness and flexibility of the disk 31, are so chosen that with variation in water pressure the disk will deflect only to the extent to compensate for this variation in water pressure, so as to maintain a constant pressure differential or constant upward force on the valve stem 26 when the valve is open. Because of the cylindrical character of the walls 11, this force is also essentially constant regardless of the position of the valve washer 32 once it has opened a predetermined initial distance.

The float-operated valve is intended primarily for toilet flush tanks. In the operation of such tanks, the float-operated valve is quickly moved from its closed to its fully open position by reason of the rapid drainage of water from the tank. Water then flows into the tank until the force produced by the float connected with the valve is great enough to overcome the water pressure in the supply line connected with the inlet pipe 10. In the operation of a typical float-operated valve, the float gradually rises and the valve gradually closes resulting in delay in refilling the flush tank and in producing objectionable noises.

Figure 3:
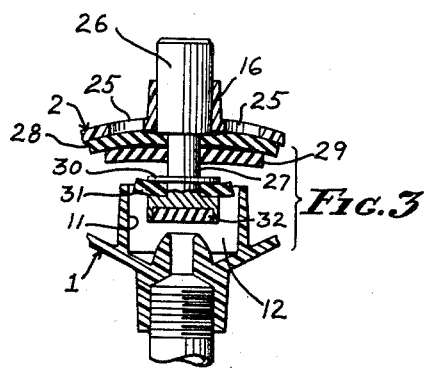
FIGURE 3 is a fragmentary sectional view thereof taken through 3—3 of FIGURE 2 showing the valve in its fully open position.
Figure 4:
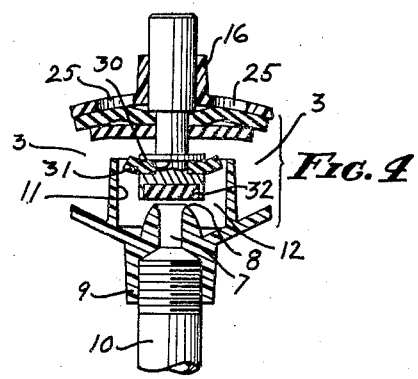
FIGURE 4 is a similar, fragmentary, sectional view showing the position of the valve under the condition just as the force of the float overcomes the pressure differential across the retarding disk and the valve is about to move rapidly to its closed position.

This is overcome in the hereinbefore described float-operated valve as follows:

When the valve is in its fully open position shown in FIGURE 3, the delaying or retarding disk 31 is at the mouth or upper end of the cavity 12. Any further opening of the valve would quickly reduce pressure across the disk as the space between the disk 31 and the mouth of the cavity 12 would increase. It is not necessary that it open further, and this position may be determined by the stop screw 22. As the toilet flush tank refills, the water tends to lift the float; however, the predetermined annular space between the disk 31 and the walls 11 predetermines the pressure differential across the disk so that there exists a predetermined upward force opposing movement of the float. Thus, the float tends to remain fixed in position until the water has raised a substantial amount around the float, and the force exerted by the float and through the roller 21 on the stem 26 is sufficient to overcome the upward force exerted by flow of water around the disk 31. When this occurs, there is a relatively quick movement of the float sufficient to move the valve washer close to the seat. When this occurs, the upward flow of water around the disk 31 and the corresponding upward force drops rapidly causing the valve washer to move quickly to its fully closed position.

Stated otherwise, the pressure area changes rapidly from substantially that of the disk 31 to that of the bore 7, so that the energy stored in the float assures quick closing of the valve. The closing rate need not, however, be so rapid as to produce an objectionable water hammer, for such transient pressure surges are damped by the disk 31.

It should be observed that in order to obtain the quick closing action, it is essential that the pressure differential be substantially constant. This is accomplished by the provision of the cylindrical walls 11 as distinguished from upwardly diverging walls. It is also facilitated by snugly holding the disk 31, rather than loosely retaining it. Further, it is accomplished by making the disk 31 relatively stiff. By providing a limited degree of marginal flexibility, however, some compensation for different line-pressure conditions is attained, as the disk in flexing slightly increases correspondingly the flow passage therearound. Excessive flexing, however, would defeat the delaying action of the disk 31.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A float-operated valve, comprising: a valve housing defining a valve chamber, cylindrical walls projecting upwardly from the lower side of said valve chamber to form a cylindrical cavity having an open mouth at its upper end and an inlet at its bottom end, an outlet communicating with said chamber radially outwardly of said cylindrical walls, and a valve stem guide in coaxial relation to said inlet; a valve stem movable in said guide; a valve element at the lower end of said valve stem and engageable with said inlet at the downstream end thereof, whereby said valve element tends to open in response to water pressure at said inlet; a disk axially fixed adjacent the lower end of said valve stem forming with the cylindrical walls of said cavity an annular orifice of predetermined diameter, to produce a predetermined greater pressure below said disk than above said disk, thereby to establish a predetermined upward force tending to resist seating of said valve element; and a float for operating said valve stem and arranged to exert a downward force to close said valve element.

2. A float-operated valve, comprising: a valve housing defining a valve chamber, cylindrical walls projecting upwardly from the lower side of said valve chamber to form a cylindrical cavity having an open mouth at its upper end and an inlet at its bottom end, an outlet communicating with said chamber radially outwardly of said cylindrical walls, and a valve stem guide in coaxial relation to said inlet; a valve stem movable in said guide; a valve element at the lower end of said valve stem and engageable with said inlet at the downstream end thereof, whereby said valve element tends to open in response to water pressure at said inlet; a disk axially fixed to said valve stem adjacent said valve element having a peripheral portion of limited flexibility forming with the cylindrical walls of said cavity an annular throat tending to increase in area with increased pressure of water issuing from said inlet in proportion to said pressure, thereby tending to maintain a uniform pressure differential across said disk exerting a predetermined force resisting closing of said valve; and means for overcoming said force thereby to effect closure of said valve element.

3. A float-operated valve, comprising: a valve housing defining a valve chamber, cylindrical walls projecting upwardly from the lower side of said valve chamber to form a cylindrical cavity having an open mouth at its upper end and an inlet at its bottom end, an outlet communicating with said chamber radially outwardly of said cylindrical walls, and a valve stem guide in coaxial relation to said inlet; a valve stem movable in said guide; a valve element at the lower end of said valve stem and engageable with said inlet; a disk fixed on said stem adjacent said valve element and movable therewith between an upper position substantially coincident with the mouth of said cavity wherein said valve element is in its fully open condition and a lower position within said cavity wherein said valve element is in its fully closed condition, said disk forming with the cylindrical walls of said cavity a throat of constant diameter between said upper and lower positions, tending to produce a constant pressure differential across said disk for any position thereof, thereby tending to produce a constant force to hold said valve element open whereby, on application of a greater opposing force, said valve element moves from its fully open to its fully closed position; and a float for exerting such greater opposing force.

References Cited in the file of this patent

UNITED STATES PATENTS

| | | |
|---|---|---|
| 769,550 | Leithanser | Sept. 6, 1904 |
| 996,743 | Yancey | July 4, 1911 |
| 1,903,816 | Hanson et al. | Apr. 18, 1933 |
| 2,635,622 | Owens | Apr. 21, 1953 |